(12) United States Patent
Ishibashi et al.

(10) Patent No.: US 9,041,355 B2
(45) Date of Patent: May 26, 2015

(54) BATTERY CONTROLLER, BATTERY CONTROL METHOD AND PROGRAM

(75) Inventors: Yoshihito Ishibashi, Tokyo (JP);
Shigeru Tajima, Kanagawa (JP);
Daisuke Yamazaki, Tokyo (JP);
Masahiro Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 963 days.

(21) Appl. No.: 13/087,917

(22) Filed: Apr. 15, 2011

(65) Prior Publication Data

US 2011/0260691 A1   Oct. 27, 2011

(30) Foreign Application Priority Data

Apr. 21, 2010   (JP) .................................. 2010-097916

(51) Int. Cl.
*H02J 7/00* (2006.01)
*B60L 11/18* (2006.01)

(52) U.S. Cl.
CPC ........... *H02J 7/0029* (2013.01); *B60L 11/1842* (2013.01); *B60L 11/1861* (2013.01); *H02J 7/0063* (2013.01); *H02J 2007/0067* (2013.01); *Y02T 10/7005* (2013.01); *Y02T 10/7044* (2013.01); *Y02T 10/705* (2013.01); *Y02T 90/128* (2013.01); *Y02T 90/14* (2013.01); *Y02T 90/163* (2013.01); *Y04S 10/126* (2013.01); *Y02E 60/721* (2013.01); *Y02T 90/121* (2013.01)

(58) Field of Classification Search
CPC ........................................................ Y02T 90/14
USPC .................................................. 320/134, 104
See application file for complete search history.

(56) References Cited

U.S. PATENT DOCUMENTS

| | | | | |
|---|---|---|---|---|
| 5,343,137 | A * | 8/1994 | Kitaoka et al. | 320/132 |
| 2004/0140904 | A1 * | 7/2004 | Bertness | 340/636.15 |
| 2006/0284614 | A1 * | 12/2006 | Kim et al. | 324/149 |
| 2009/0237085 | A1 * | 9/2009 | Suto | 324/426 |
| 2009/0313174 | A1 * | 12/2009 | Hafner et al. | 705/80 |
| 2010/0106401 | A1 * | 4/2010 | Naito et al. | 701/201 |
| 2010/0117594 | A1 * | 5/2010 | Bissontz | 320/104 |
| 2010/0123438 | A1 * | 5/2010 | Harada | 320/162 |

* cited by examiner

*Primary Examiner* — Edward Tso
*Assistant Examiner* — Johali Torres Ruiz
(74) *Attorney, Agent, or Firm* — Sony Corporation

(57) ABSTRACT

There is provided a battery controller including a storing unit which stores an upper limit voltage and a lower limit voltage, each defining a first voltage range in which a battery is charged/discharged, and a second upper limit voltage and a second lower limit voltage, each defining a second voltage range which is wider than the first voltage range, and a charge/discharge regulation unit which temporarily changes, when charge/discharge is performed in the first voltage range and permission for charge/discharge in the second voltage is received, setting of the battery such that charge/discharge is performed in the second voltage range.

24 Claims, 10 Drawing Sheets

BATTERY CONTROLLER, BATTERY CONTROL METHOD AND PROGRAM

CROSS REFERENCES TO RELATED APPLICATIONS

The present application claims priority to Japanese Priority Patent Application JP 2010-097916 filed with the Japan Patent Office on Apr. 21, 2010, the entire content of which is hereby incorporated by reference.

BACKGROUND

The present application relates to a battery controller, a battery control method, and a program.

A range of voltage applicable to a secondary battery, which can be repeatedly charged and discharged, is defined by an upper voltage and a lower voltage. It is possible to expand the life span of the secondary battery, by setting the applicable voltage range narrower than a range of voltage in which the battery can be charged or discharged. FIG. 7 shows ranges of voltage applicable to secondary batteries for an electric vehicle and for a household, respectively, and voltage ranges in which the secondary batteries for an electric vehicle and for a household can be charged or discharged, respectively.

An upper limit voltage is a set value to or above which the voltage should not be raised when a secondary battery is charged, and is a value which is equal to or lower than a maximum charge voltage. A lower limit voltage is a set value to or below which the voltage should not be lowered when a secondary battery is discharged, and is a value which is equal to or higher than a final discharge voltage.

It is generally known that the degradation of a second battery is accelerated, when the battery is charged at voltage equal to or higher than the maximum charge voltage and, after that, the battery is kept in such state. For this reason, the upper limit voltage of the secondary battery needs to be set to a value which is lower than the maximum charge voltage. Further, when the battery has been discharged at voltage equal to or lower than the final discharge voltage, and when the battery is further discharged, its voltage then rapidly decreases with the discharge. And when the voltage decreases to a certain voltage or less, the corresponding battery cannot be sufficiently charged and would not possibly work. For this reason, the lower limit voltage of the secondary battery needs to be set to a value which is higher than the final discharge voltage.

SUMMARY

The upper limit voltage and the lower limit voltage of the range of voltage applicable to the secondary battery described above are set in accordance with uses such as electric-vehicle use and household use. As shown in FIG. 7, the range of voltage applicable to a secondary battery for an electric vehicle is set narrower than that for a household. This is because the secondary battery for an electric vehicle is used in a more severe circumstance in comparison with the secondary battery for a household. For example, an instantaneous discharge current of the secondary battery for an electric vehicle is larger, or the number of times the secondary battery for an electric vehicle is repeatedly used is larger.

Incidentally, once a range of voltage applicable to a secondary battery is set, the voltage range is generally fixed. For this reason, when the applicable voltage range defined by an upper limit voltage and a lower limit voltage is remarkably narrower than a range of voltage defined by a maximum charge voltage and a final discharge voltage, the use of the secondary battery is restricted, though the secondary battery can be further used. For example, there arises an issue, during traveling, that an electric vehicle cannot travel because the lower limit voltage is reached, even though the electric vehicle can almost reach a charging station. Further, there is an issue that, when a secondary battery for an electric vehicle is diverted to a secondary battery for a household, a range of voltage applicable to the secondary battery for an electric vehicle is unsuitable for the secondary battery for a household. Further, in case of charging a secondary battery by natural energy power generation, even though much electric power was generated due to a fluctuation of natural energy, the battery could not be charged with the electric power at all and the electric power had to be wasted, because the upper limit voltage was reached.

In light of the foregoing, it is desirable to provide a battery controller, a battery control method, and a program, which are novel and improved, and which are capable of changing a set voltage range regarding charge/discharge and extending charge or discharge capability.

According to an embodiment, there is provided a battery controller including a storing unit which stores an upper limit voltage and a lower limit voltage, each defining a first voltage range in which a battery is charged/discharged, and a second upper limit voltage and a second lower limit voltage, each defining a second voltage range which is wider than the first voltage range, and a charge/discharge regulation unit which temporarily changes, when charge/discharge is performed in the first voltage range and permission for charge/discharge in the second voltage is received, setting of the battery such that charge/discharge is performed in the second voltage range.

According to another embodiment, there is provided a battery controller including a storing unit which stores a lower limit voltage, which defines a discharge range of a battery, and a second lower limit voltage which is lower than the lower limit voltage, a voltage measurement unit which measures a current voltage of the battery, a necessary power calculation unit which calculates necessary electric power of the battery, which is necessary for a moving object to move from a current point of the moving object to a point where the battery can be charged, and a charge/discharge regulation unit which temporarily changes setting of the battery, according to determination results based on the current voltage and the necessary electric power, such that the battery is discharged at battery voltage between the lower limit voltage and the second lower limit voltage.

The battery controller may further include a time measurement unit which measures time during which the battery is being discharged at battery voltage equal to or lower than the lower limit voltage, when setting of the battery was temporarily changed. The charge/discharge regulation unit may give a warning to a user, when time during which the battery is being discharged at battery voltage equal to or lower than the lower limit voltage reached or exceeded a predetermined time.

The battery controller may further include a time measurement unit which measures time during which the battery is being discharged at battery voltage equal to or lower than the lower limit voltage, when setting of the battery was temporarily changed. The charge/discharge regulation unit may reduce, when time during which the battery is being discharged at battery voltage equal to or lower than the lower limit voltage reached or exceeded a predetermined time, an amount of current to be discharged from the battery after the predetermined time.

An amount of current to be discharged from the battery may be gradually reduced according to time during which the battery is being discharged at battery voltage equal to or lower than the lower limit voltage.

A battery controller further includes a time measurement unit which measures time during which the battery is being discharged at battery voltage equal to or lower than the lower limit voltage, when setting of the battery was temporarily changed. The charge/discharge regulation unit may stop discharge from the battery, when time during which the battery is being discharged at battery voltage equal to or lower than the lower limit voltage reached or exceeded a predetermined time, even if the current voltage is equal to or higher than the second lower voltage.

The charge/discharge regulation unit may reduce an amount of current to be discharged from the battery, when the battery is discharged at battery voltage equal to or lower than the lower limit voltage.

Control may be performed such that kinetic energy is recovered by preferential use of regenerative brake, when the battery is discharged at battery voltage equal to or lower than the lower limit voltage.

According to another embodiment, there is provided a battery controller including a storing unit which stores an upper limit voltage which defines a charge range of a battery, and a second upper limit voltage which is higher than the upper limit voltage, a voltage measurement unit which measures a current voltage of the battery, and a charge/discharge regulation unit which temporarily changes setting of the battery, according to determination results based on the current voltage, such that the battery is charged at battery voltage between the upper limit voltage and the second upper limit voltage.

The battery controller may further include a time measurement unit which measures time during which the battery is being charged at battery voltage equal to or higher than the upper limit voltage, when setting of the battery was temporarily changed. The charge/discharge regulation unit may stop charge of the battery, when time during which the battery is being charged at battery voltage equal to or higher than the upper limit voltage reached or exceeded a predetermined time, even if the current voltage is equal to or lower than the second upper limit voltage.

The charge/discharge regulation unit may cause the battery to be discharged when the current voltage reached the second upper limit voltage.

In a case where the battery is connected to a Smart Grid, when time during which the battery is being charged at battery voltage equal to or higher than the upper limit voltage reached or exceeded a predetermined time, or when the current voltage reached the second upper limit voltage, the discharge/charge management unit may issue a discharge request to a server which regulates power supply of the Smart Grid.

After setting of the battery was changed, when a value of the voltage of the battery has fallen within the first voltage range, the charge/discharge regulation unit may restore setting of the battery such that the battery is charged/discharged in the first voltage range.

After setting of the battery was changed, when the current voltage has increased to the lower limit voltage or more, the charge/discharge regulation unit may restore setting of the battery such that the battery is discharged exclusively at battery voltage equal to or higher than the lower limit voltage.

After setting of the battery was changed, when the current voltage has decreased to the upper limit voltage or less, the charge/discharge regulation unit may restore setting of the battery such that the battery is charged exclusively at battery voltage equal to or lower than the upper limit voltage.

The storing unit may store time at which setting of the battery was temporarily changed or the number of times setting of the battery was temporarily changed.

According to another embodiment, there is provided a battery control method, including the steps of storing by a storing unit an upper limit voltage and a lower limit voltage, each defining a first voltage range in which a battery is charged/discharged, and a second upper limit voltage and a second lower limit voltage, each defining a second voltage range which is wider than the first voltage range, and temporarily changing, when charge/discharge is performed in the first voltage range and permission for charge/discharge in the second voltage is received, setting of the battery such that charge/discharge is performed in the second voltage range.

According to another embodiment, there is provided a battery control method, including the steps of storing by a storing unit a lower limit voltage, which defines a discharge range of a battery, and a second lower limit voltage which is lower than the lower limit voltage, measuring a current voltage of the battery, calculating necessary electric power of the battery, which is necessary for a moving object to move from a current point of the moving object to a point where the battery can be charged, and temporarily changing setting of the battery, according to determination results based on the current voltage and the necessary electric power, such that the battery is discharged at battery voltage between the lower limit voltage and the second lower limit voltage.

According to another embodiment, there is provided a battery control method, including the steps of storing by a storing unit an upper limit voltage, which defines a charge range of a battery, and a second upper limit voltage which is higher than the upper limit voltage, measuring a current voltage of the battery, and temporarily changing setting of the battery, according to determination results based on the current voltage, such that the battery is charged at battery voltage between the upper limit voltage and the second upper limit voltage.

According to another embodiment, there is provided a program for causing a computer to perform the steps of storing an upper limit voltage and a lower limit voltage, each defining a first voltage range in which a battery is charged/discharged, and a second upper limit voltage and a second lower limit voltage, each defining a second voltage range which is wider than the first voltage range, and temporarily changing, when charge/discharge is performed in the first voltage range and permission for charge/discharge in the second voltage is received, setting of the battery such that charge/discharge is performed in the second voltage range.

According to another embodiment, there is provided a program for causing a computer to perform the steps of storing a lower limit voltage, which defines a discharge range of a battery, and a second lower limit voltage which is lower than the lower limit voltage, measuring a current voltage of the battery, calculating necessary electric power of the battery, which is necessary for a moving object to move from a current point of the moving object to a point where the battery can be charged, and temporarily changing setting of the battery, according to determination results based on the current voltage and the necessary electric power, such that the battery is discharged at battery voltage between the lower limit voltage and the second lower limit voltage.

According to another embodiment, there is provided a program for causing a computer to perform the steps of storing an upper limit voltage, which defines a charge range of a battery, and a second upper limit voltage which is higher than the upper limit voltage, measuring a current voltage of the battery, and temporarily changing setting of the battery, according to determination results based on the current voltage, such that the battery is charged at battery voltage between the upper limit voltage and the second upper limit voltage.

According to the embodiments of the present application described above, it is possible to change a set voltage range regarding charge/discharge and to extend charge or discharge capability.

Additional features and advantages are described herein, and will be apparent from the following Detailed Description and the figures.

DETAILED DESCRIPTION

Figure 1:
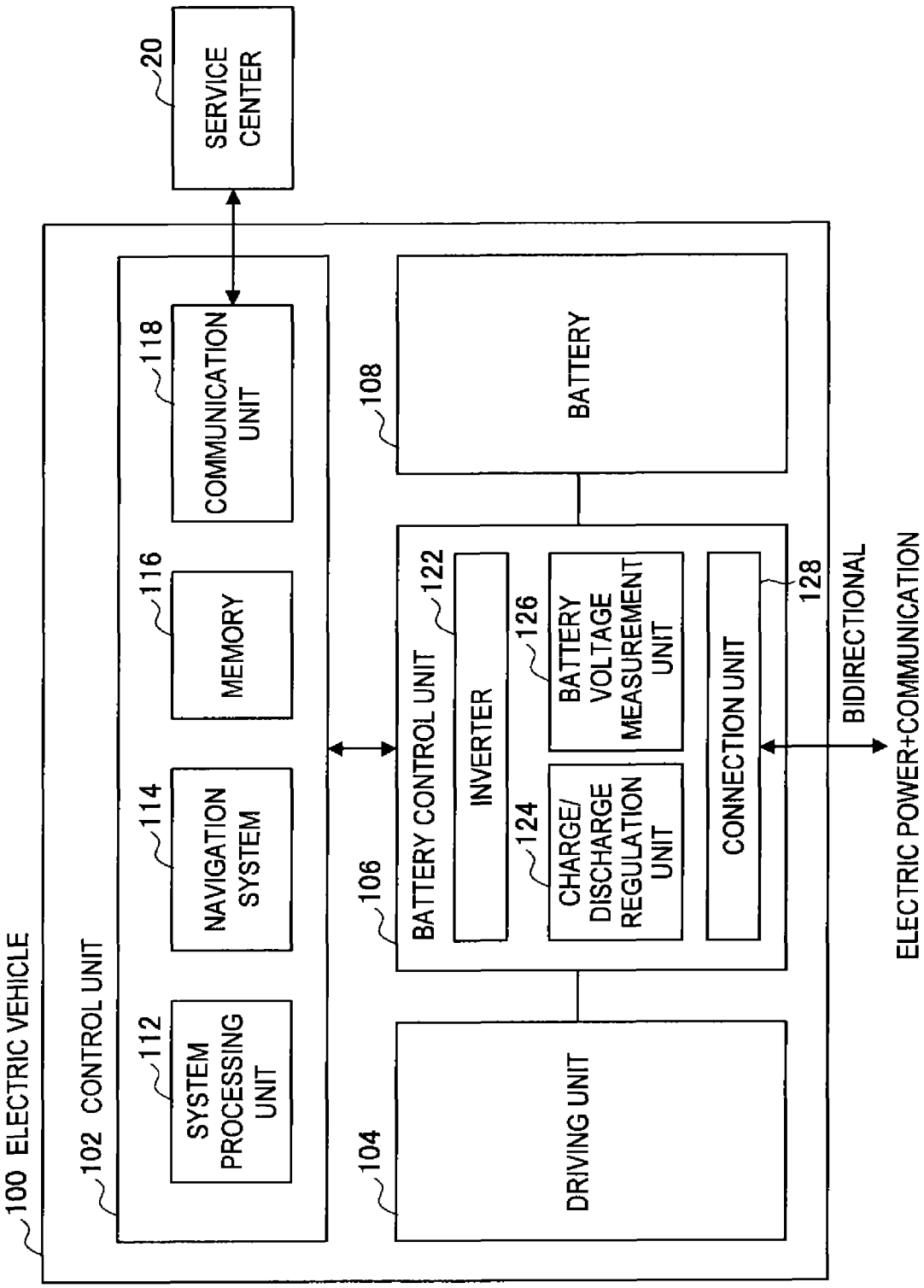
FIG. 1 is a block diagram illustrating an electric vehicle 100 according to an embodiment.

Embodiments of the present application will be described below in detail with reference to the drawings.

Hereinafter, preferred embodiments of the present application will be described in detail with reference to the appended drawings. Note that, in this specification and the appended drawings, structural elements that have substantially the same function and structure are denoted with the same reference numerals, and repeated explanation of these structural elements is omitted.

Beside, explanation will be made in the following order.
1. Configuration according to an embodiment
2. Operation according to an embodiment 1. Configuration According to an Embodiment A configuration of an electric vehicle 100 according to an embodiment will be explained. FIG. 1 is a block diagram illustrating the electric vehicle 100 according to the present embodiment.

The electric vehicle 100 is an example of a moving object, and has a battery 108 and changes a range of voltage applicable to the battery 108, depending on a situation or a use. As a result, charge or discharge capability of the battery 108 can be extended and the life span of the battery 108 can be lengthened. The electric vehicle 108 includes, for example, a control unit 102, a driving unit 104, a battery control unit 106, and the battery 108. Hereafter, each component will be explained.

The control unit 102 includes, for example, a system processing unit 112, a navigation system 114, a memory 116, and a communication unit 118.

The system processing unit 112 is, for example, a Central Processing Unit (CPU), and controls each component of the control unit 102 and the battery control unit 106.

The navigation system 114 uses, for example, a Global Positioning System (GPS), and manages location information such as a current location and a destination of an electric vehicle, and a charging station. Further, the navigation system 114 calculates a distance from a current location to a destination or a charging station, or the like, or calculates an amount of electric power necessary for traveling the distance. The navigation system 114 is an example of a necessary power calculation unit.

The memory 116 stores programs and various types of data. Further, the memory 116 stores an upper limit range and a lower limit range, each defining a range of voltage applicable to the battery 108, a maximum charge voltage and a final discharge voltage, each defining a range of voltage in which the battery 108 can be charged/discharged, and a second upper voltage and a second lower voltage, which will be described later. Besides, the memory 116 may be provided in the battery control unit 106, not in the control unit 102. Programs and various types of data may be stored in, but not limited to, the memory 116 provided in the control unit 102, and may be also stored in a nonvolatile memory within the system processing unit 112 (CPU).

The communication unit 118 is an interface for communicating with an external service center 20, and communicates via a wireless public line, for example. Besides, a wired line may be used in the communication by the communication unit 118. Further, the communication unit 118 may be an adapter (a hook-up). When the communication unit 118 is an adapter, then, a mobile phone, a wireless communication device, a wired communication device, or the like is connected thereto.

The driving unit 104 is, for example, a motor for driving the electric vehicle 100. Electric power is supplied, via the battery control unit 106, from the battery 108 to the driving unit 104.

The battery control unit 106 is connected to the battery 108 and controls the battery 108. The battery control unit 106 includes, for example, an inverter 122, a charge/discharge regulation unit 124, a battery voltage measurement unit 126, and a connection unit 128.

The inverter 122 converts direct-current power from the battery 108 into alternating current power, and supplies the same to the motor of the driving unit 104.

The charge/discharge regulation unit 124 changes a range of voltage applicable to the battery 108, depending on the voltage of the battery 108, a situation where the electric vehicle 100 is, or the like. Further, the charge/discharge regulation unit 124 is an example of a time measurement unit, and measures time during which the battery 108 is being charged/discharged. Operation of the charge/discharge regulation unit 124 will be later described in detail.

The battery voltage measurement unit 126 measures the voltage of the battery 108 and transmits measurement results to the charge/discharge regulation unit 124.

The connection unit 128 has a hook-up, and performs charge from an external power source to the battery 108 or discharge from the battery 108 to an external device. Further, the connection unit 128 may be made intelligent in conformity with a Smart Grid. Thereby, it becomes possible to control between an electric vehicle and an external power source as well as between an electric vehicle and an external device. Further, a communication line may be connected to the connection unit 128 along the same route as that of a power line, or may be connected along a different route.

The battery 108 is a chargeable/dischargeable secondary battery, for example, a lithium ion battery, and is charged with electric power which is supplied via the battery control unit 106 from an external power source. Further, the battery 108 discharges while supplying electric power, via the battery control unit 106, to an external device, the driving unit 104, and the like.

Regarding Battery 108

Figure 9:
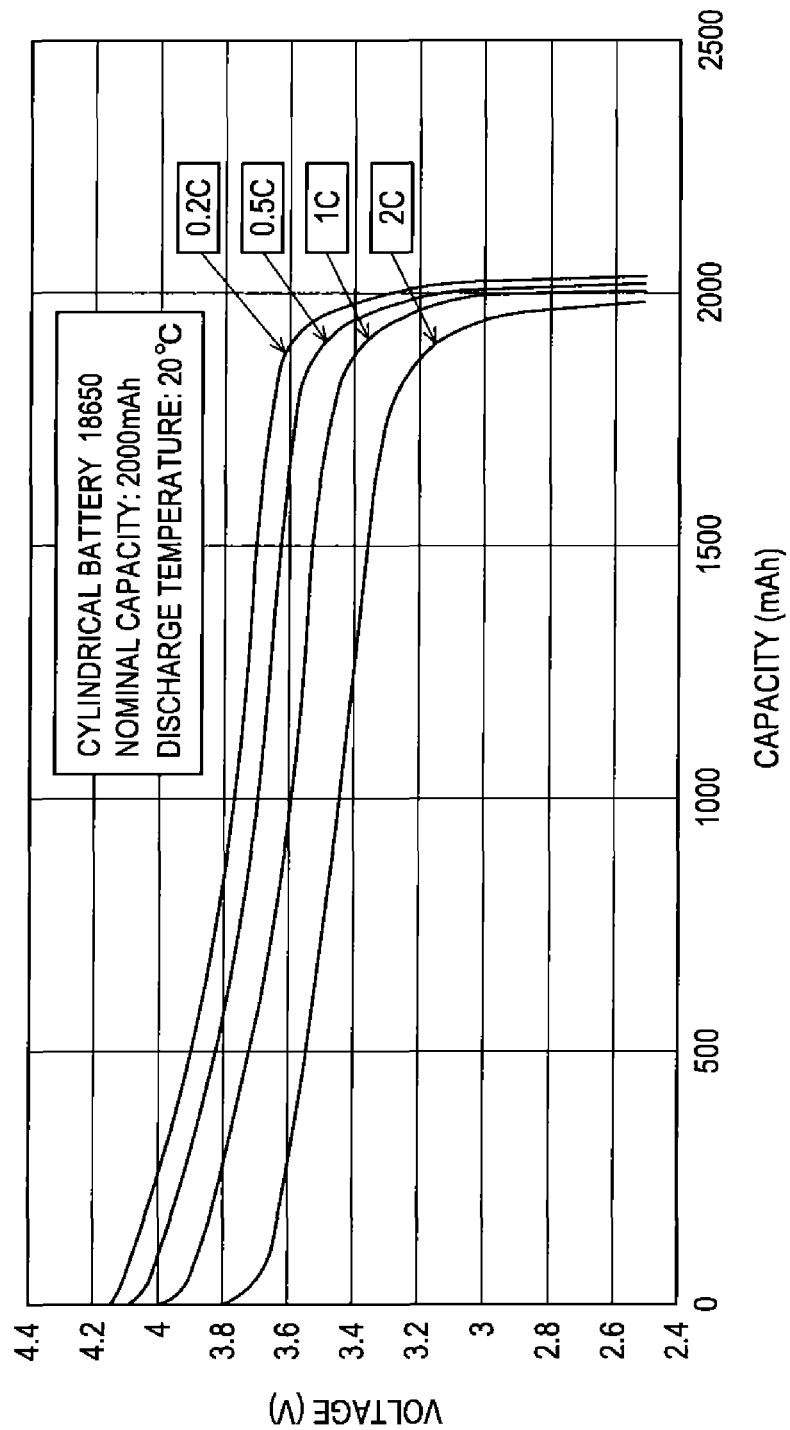
FIG. 9 is a graph illustrating discharge rate characteristics of a lithium ion battery.
Figure 10:
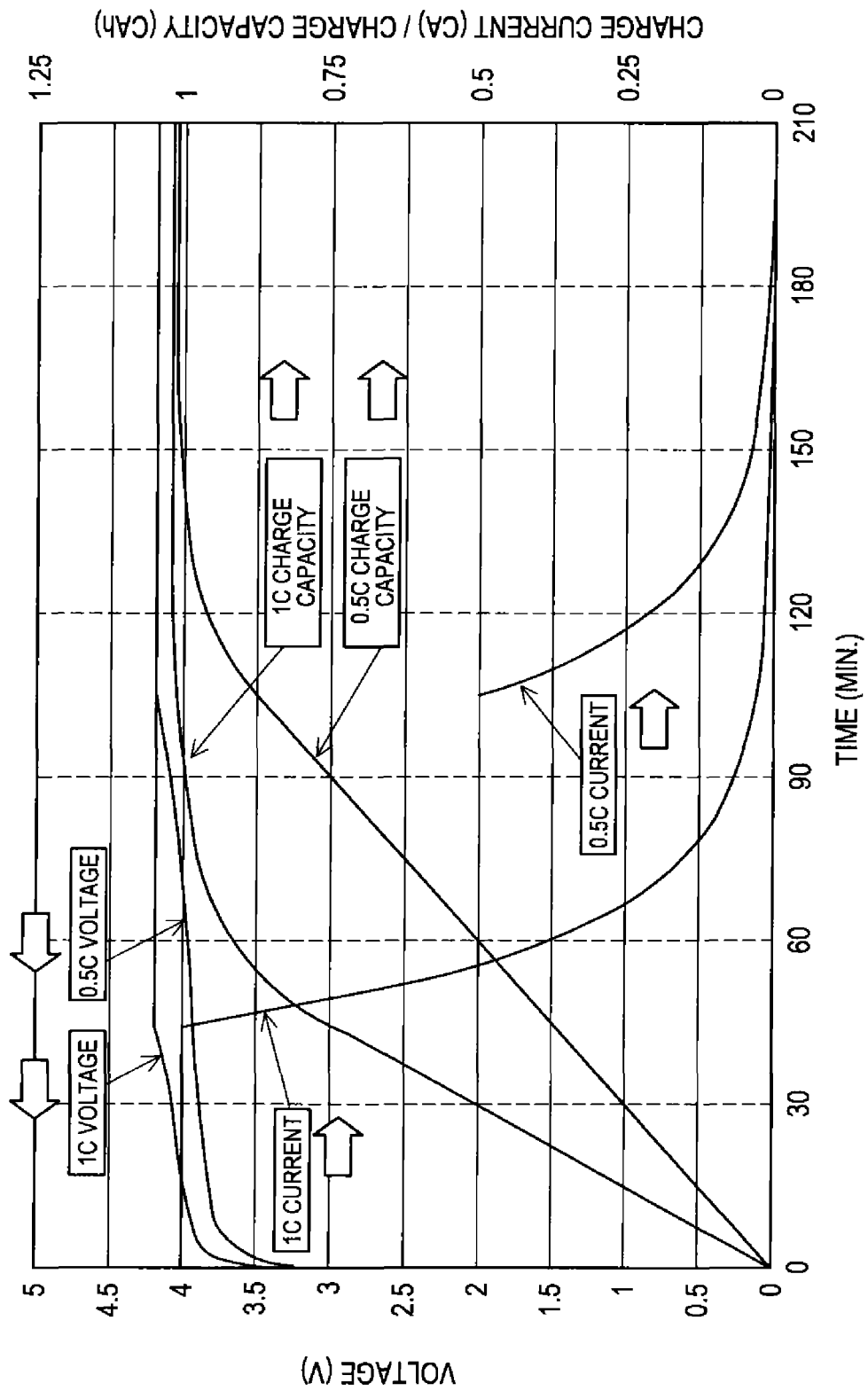
FIG. 10 is a graph illustrating constant-current/constant-voltage charging of a lithium ion battery.

Next, the battery 108 and a range of voltage applicable to the battery 108 will be explained. FIG. 9 is a graph illustrating discharge rate characteristics of a lithium ion battery and shows a relationship between voltage and capacity. FIG. 10 is a graph illustrating constant-current/constant-voltage charging of a lithium ion battery and shows a relationship between voltage and time and a relationship between a ratio of charge current to charge capacity and time.

A maximum charge voltage of the lithium ion battery is set to 4.2V per cell, for example. Incidentally, it is kwon that, when the maximum charge voltage is set below 4.2V, for example, 4.1V, the lifespan of the lithium ion battery is drastically expanded, though its charge capacity decreases. For this reason, the maximum charge voltage of a lithium ion battery which is used under severe conditions, such as being used in an electric-vehicle, is sometimes set to 4.1V or less. On the other hand, the final discharge voltage is set to approximately from 2.3V to 3.2V. However, in the example shown in FIG. 9, when the voltage falls below 3.2V, electric power is hardly obtained after that. For this reason, the lower limit voltage is set to approximately 3.2V. However, under the use condition that the battery is slowly discharged, electric power is available even when the final discharge voltage is lowered a little below 3.2V.

In the present embodiment, it is assumed that the upper limit voltage and the lower limit voltage of the battery 108 are set 4V and 3.3V, respectively. In this case, by the battery 108 being used in the electric vehicle 100, the battery 108 can sufficiently cope with a temporary use of high current, and its lifespan can be also expanded. Incidentally, the battery 108 has the characteristic that the battery 108 can be discharged for some time, even if its voltage is decreased to 3.3V or less. However, when the battery 108 is discharged in the same pace as in normal use, a speed at which the voltage of the battery 108 decreases is also accelerated, and the final discharge voltage is easily reached. Further, if the voltage reaches to the final discharge voltage or lower, the battery 108 would not possibly function.

Accordingly, in the present embodiment, when the voltage has reached the lower limit voltage (3.3V, for example), the use of the battery 108 at or below the lower limit voltage is permitted depending on conditions (for example, permission from the service center 20, or approval by individual authentication/a passcode/other keys), but the battery 108 is put into a restrict mode and a discharge amount is reduced. Further, discharge up to a second lower limit voltage is made possible (2.8V, for example), which is set apart from the lower limit voltage. Alternatively, it is made possible for the battery 108 to be used for some time, by linearly or discretely setting the discharge amount, for example, by setting the same at 0.5 C or less, if the voltage is from 3.3V to 3.0V, or at 0.2 C or less, if the voltage is from 3.0V to 2.8V.

Also with regard to charge, the lifespan of the battery 108 gets longer, when the upper limit voltage is limited to 4V, which is lower than the maximum charge voltage. However, in case of need, charge up to the maximum charge voltage (4.2V, for example) is permitted. Besides, when the battery 108 is left at the voltage which exceeds the upper limit voltage, degradation of the battery 108 is accelerated. For this reason, in the present embodiment, the battery is caused to work together with a timer, such that the battery 108 is discharged as soon as possible. For example, when the battery 108 has been maintained at the voltage of 4.2V for a predetermined time, discharge is forcibly performed, such that the corresponding voltage is decreased to the upper limit voltage (4.0V, for example).

Further, in the above example, the upper limit voltage and the lower limit voltage of the range of voltage applicable to the battery 108 are at the beginning set to 4V and 3.3V, respectively, but when use conditions of the battery 108 was changed, the upper limit voltage and the lower limit voltage are reset to 4.1V and 3.0V, respectively, for example. For example, the range of voltage applicable to the battery 108 is changed, such as when the battery 108 for an electric vehicle is divert to that for a household, and when the electric vehicle 100 is connected to a Smart Grid in a household and the battery 108 is used for a household.

2. Operation According to an Embodiment

Next, operation of the battery 108 used for the electric vehicle 100 according to an embodiment will be explained for each embodiment.

Figure 2:
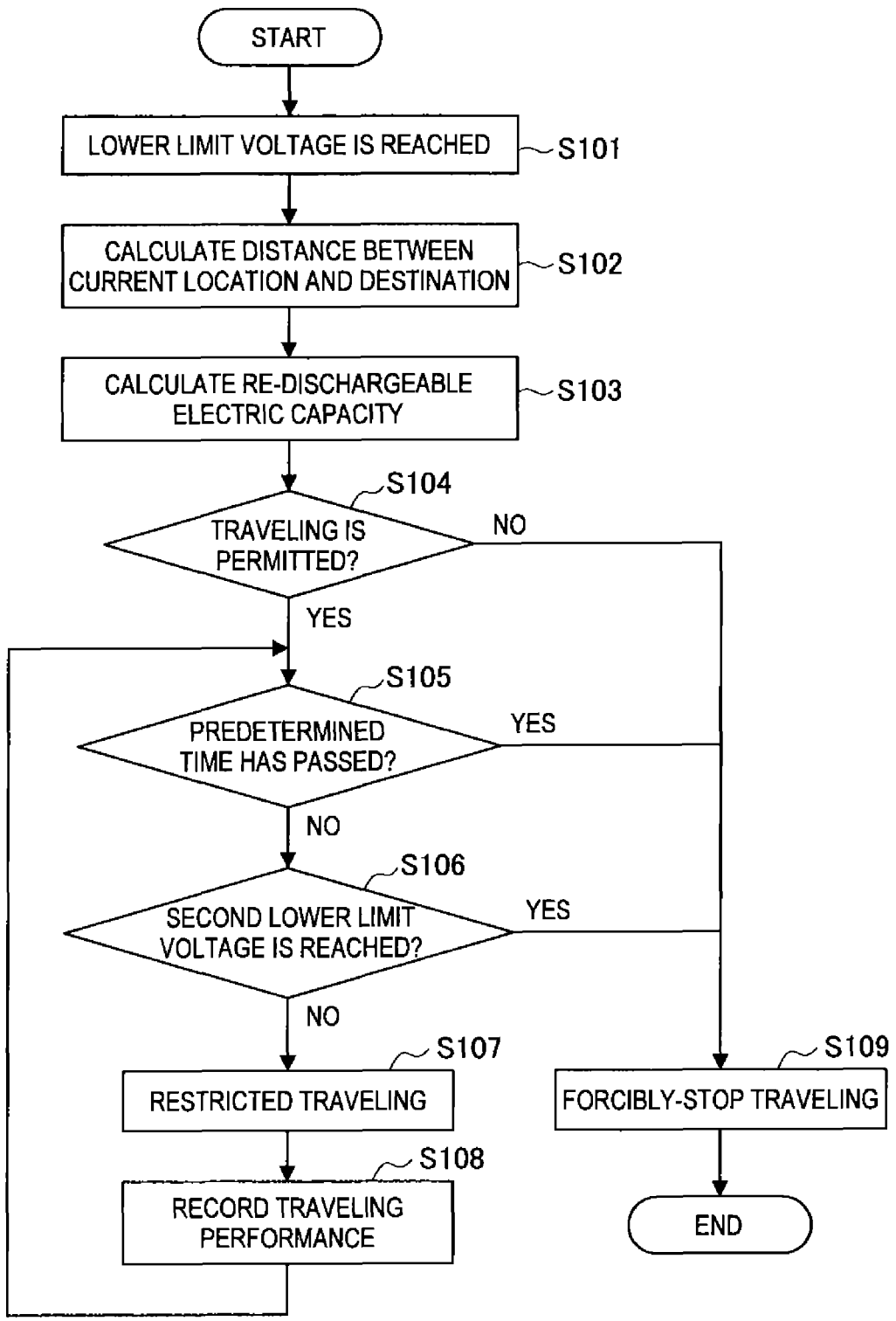
FIG. 2 is a flow chart illustrating power source regulation process according to a first embodiment.
Figure 8:
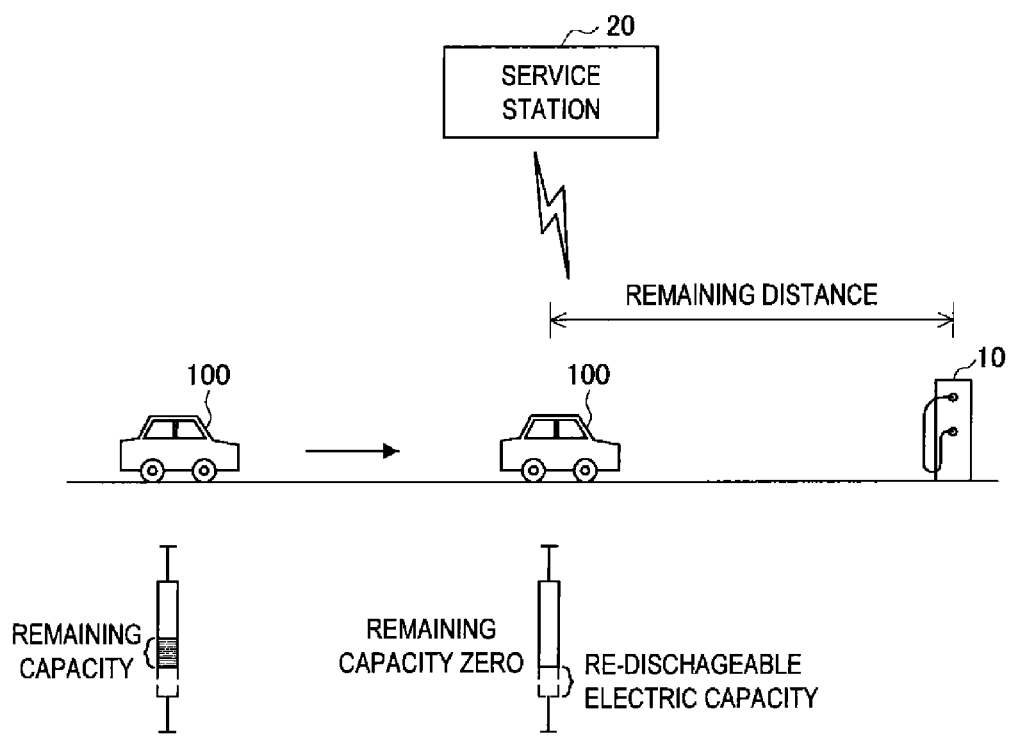
FIG. 8 is an explanatory diagram schematically illustrating a situation relating to power source regulation process of the electric vehicle 100 according to the first embodiment.

First, a method of regulating a power source of the battery 108 according to the present embodiment will be explained with reference to FIG. 2. FIG. 2 is a flow chart illustrating power source regulation process according to the present embodiment. Further, FIG. 8 is an explanatory diagram schematically illustrating a situation relating to power source regulation process of the electric vehicle 100 according to the present embodiment.

In the present embodiment, when the electric vehicle 100 has consumed electric power by traveling, for example, and a remaining capacity of the battery 108, mounted on the electric vehicle 100, has become small, the range of voltage applicable to the battery 108 is expanded.

When the remaining capacity of the battery 108, mounted on the electric vehicle 100, has become small during traveling, a meter unit (not shown), a display unit of the navigation system 114, or the like is caused via the control unit 102 to indicate a notice to that effect. Thereby, a user such as a driver can know that the remaining capacity of the battery 108 has become small.

After that, when it is determined that the voltage of the battery 108 has reached the lower limit voltage, because the electric vehicle 100 has been continuously used (step S101), it becomes impossible for the electric vehicle 100 to travel while the battery 108 is in a normal mode. Here, a current location of the electric vehicle 100 and a distance to a destination where the battery 108 can be charged, a charging station in the neighborhood, or the like are calculated (step S102). In distance calculation, a traveling distance, for example, is calculated which is actually needed by the navigation system 114, or the like.

Further, an amount of electric power necessary for traveling from a current location to a destination or the like and an amount of re-dischargeable electric capacity at the battery voltage between the lower limit voltage and the second lower limit voltage are calculated, and both amounts are compared with each other (step S103). The second lower limit voltage is a voltage value which is equal to or lower than the lower limit voltage, and is a value which is equal to or higher than the final discharge voltage. When it is determined that, even though the voltage is equal to or lower than the lower limit voltage, a destination or the like can be reached if the voltage is equal to or higher than the second lower limit voltage, it is indicated, on the display unit of the navigation system 114, or the like, that the destination can be reached. Further, when an instruction (a request) is given from a user (step S104), the lower limit of the applicable voltage range is temporarily lowered to the second lower limit voltage, and permission for traveling is given. Besides, when accepting an instruction from a user, individual authentication may be performed.

When a predetermined time has not passed since the lower limit voltage has been reached (step S105), and when a remaining capacity of the battery 108 have not reached the second lower limit voltage (step S106), restricted traveling is performed in a restrict mode (step S107).

In traveling in the restricted mode after permission, the battery is preferably charged as soon as possible, and the battery should not left at the voltage equal to or lower than the lower limit voltage. Further, the voltage value should never fall below the second lower limit voltage. For this reason, time is measured during which the voltage is equal to or lower than the lower limit voltage. And when the battery 108 is not charged, even though a certain time has passed (step S105), discharge is stopped, even though the voltage is equal to or higher than the second lower limit voltage, and traveling is forcibly stopped (step S109). Alternatively, when the battery 108 is not charged after a certain time has passed, a warning may be given or am amount of discharge current may be limited, before the traveling is forcibly stopped. Here, a certain time is time during which, even when the battery 108 is left at the voltage equal to or lower than the lower limit voltage, the function of the battery is not lowered, time taken to reach a point where the battery can be charged, or the like, the certain time being obtained by an experiment or a simulation.

The limitation of the amount of discharge current is realized by processing such as decreasing illuminance of the navigation system 114, limiting the use of an air conditioner or an AV device, stopping/restricting power supply to an in-vehicle option device, and restricting acceleration/limiting a speed. The discharge current may be limited when the voltage has become equal to or lower than the lower limit voltage, regardless of elapsed time, or the limitation may be gradually tightened with time or with the decrease of the voltage. Further, a regenerative brake may be used in priority to a hydraulic brake, and transition into a mode in which kinetic energy is recovered may be made.

After permission was given, when the second lower limit voltage is reached (step S106), traveling is forcibly stopped (step S109). Besides, in the above explanation, when the battery is not charged after a certain time has passed, discharge current is limited, but an amount of the discharge current may be limited at the time where restricted traveling is started.

When the electric vehicle 100 reached a charging station and the battery 108 is charged, the restrict mode is released and transition into a normal mode is made. When it is returned to the normal mode, the lower limit of the applicable voltage range is reset to a value of the lower limit voltage at the beginning.

Besides, when it was traveled in the restrict mode, information on traveling performance in which it was in the restrict mode (time at which transition into the restrict mode was made, a number of times transition into the restrict mode was made, for example) may be recorded, for example, in the memory 116 within the electric vehicle 100 (step S108). The traveling performance information may be used in car maintenance. For example, a battery 108 which has once been put into the restrict mode may be more degraded than the battery 108 which has never been put into the restrict mode. For this reason, the battery 108 is replaced in car maintenance, even when time at which the battery 108 is to be replaced has not come, or performance evaluation of the battery 108 is more strictly checked.

As described above, according to the present embodiment, under the condition that the battery 108 is charged for a short time, the applicable voltage range, which has been preset, is changed and power supply from the battery 108 can be continued. As a result, when the lower limit voltage is reached, during traveling, under a situation where a charging station can be almost reached, the electric vehicle 100 can further travel to a place where the battery 108 can be charged, without being forcibly stopped on a road.

2. Second Embodiment

In the first embodiment described above, transition into a restrict mode can be made according to the will of a user. However, there exists a considerable risk, even though the user takes responsibility for it. Accordingly, in the second embodiment, connection to the service center 20 is established via the communication unit 118, and determination/control whether or not transition into the restrict mode is permitted is performed on the side of the service center 20.

Figure 3:
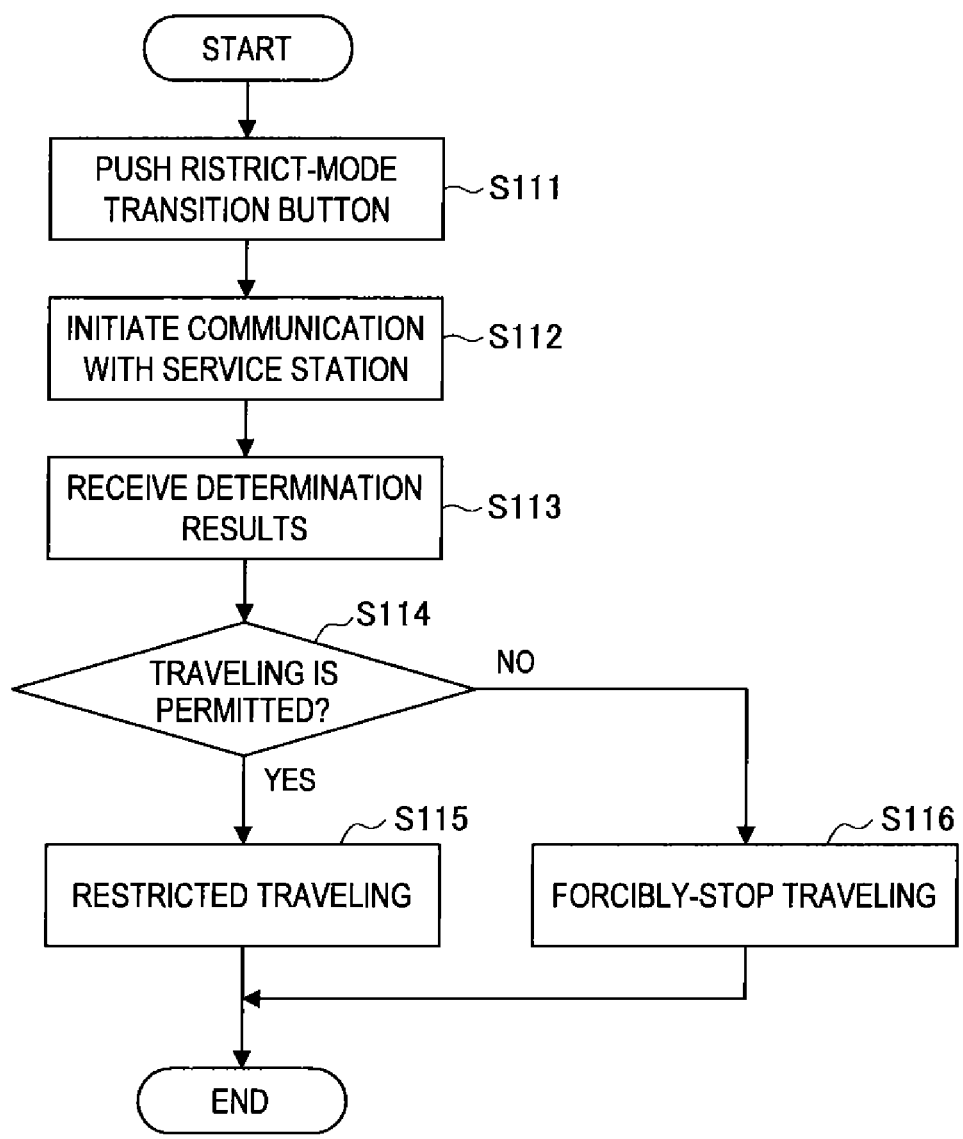
FIG. 3 is a flow chart illustrating power source regulation process on the side of the electric vehicle 100 according to a second embodiment.
Figure 4:
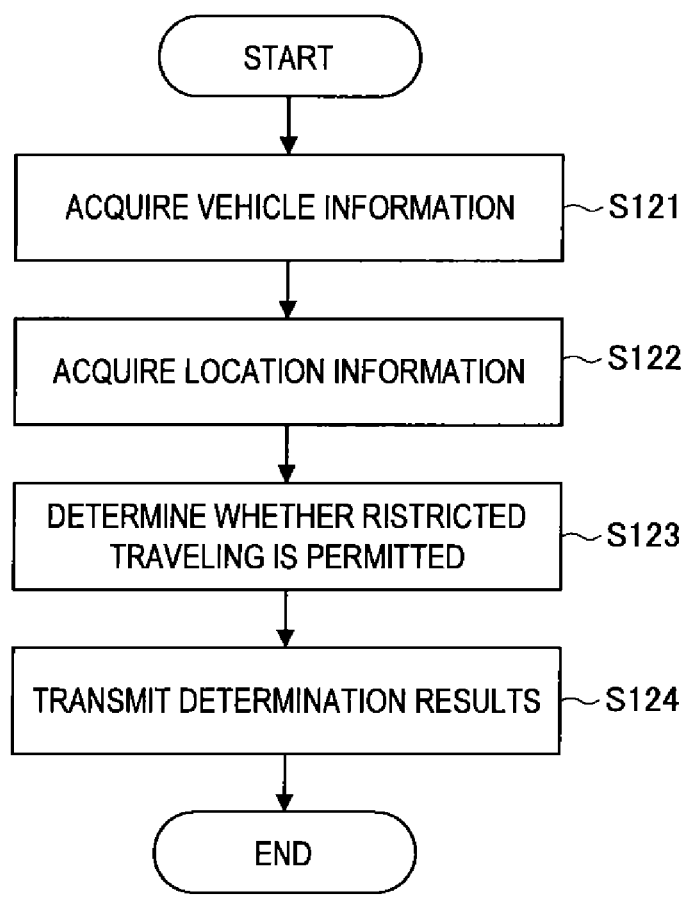
FIG. 4 is a flow chart illustrating power source regulation process on the side of a service center 20 according to the second embodiment.

A method of regulating a power source of the battery 108 according to the second embodiment will be explained with reference to FIGS. 3 and 4. FIG. 3 is a flow chart illustrating power source regulation process on the side of the electric vehicle 100 according to the present embodiment. FIG. 4 is a flow chart illustrating power source regulation process on the side of the service center 20 according to the present embodiment.

When it is determined that, even though the voltage of the battery 108 is equal to or lower than the lower limit voltage, a destination or the like can be reached if the battery voltage is equal to or higher than the second lower limit voltage, the electric vehicle 100 indicates, on the display unit or the like of the navigation system 114, that the destination or the like can be reached. Further, a user pushes a restrict-mode transition button (not shown) (step S111). Then, the electric vehicle 100 initiates radio communication with the service center 20 (step S112).

The service center 20 acquires information within the electric vehicle 100 and recognizes the shortage of a remaining amount of battery 108 (step S121). Further, the service center 20 acquires information on location of the electric vehicle 100 (step S122). Location information is, for example, information obtained from the navigation system 114 of the electric vehicle 100.

Then, an operator or an auxiliary device, such as a computer, in the service center 20 determines whether or not a charging facility (a destination or a charging station, for example) in the neighborhood can be reached by restricted traveling (step S123). After that, the service center 20 transmits determination results to the electric vehicle 100 (step S124).

The electric vehicle 100 receives the determination results and notifies the user of the same by voice/display, for example (step S113). When, as determination results, permission for traveling is given (step S114), the electric vehicle 100 is put into the restrict mode by remote operation or the like, and performs restricted traveling (step S115). On the other hand, when, as determination results, permission for traveling is not given (step S114), it becomes impossible for the electric vehicle 100 to travel and the electric vehicle 100 remains forcibly stopped (step S116).

Besides, a series of processes may be started, by the user taking contact with the service center by a mobile phone and giving notification of the vehicle identification number (confirmation may be also made by individual information such as a telephone number), and by the communication connection from the service center to the electric vehicle being established. Here, in order to verify a person who has taken contact by a mobile phone and to determine whether the corresponding person is really present at the corresponding point, an individual authentication technique (provided on the vehicle or on the mobile phone) may be used, or determination may be made by simple personal identification (by an address, birthday, a passcode, or the like). Furthermore, it may be automatically determined, from information obtained by the GPS function of the mobile phone and by navigation system 114 of the electric vehicle 100, that the corresponding person is at the same point as indicated by the above information.

Besides, when it was traveled in the restrict mode, traveling performance in which it was traveled after transition into the restricted mode may be recorded within the service center 20. Traveling performance may be used, for example, in car maintenance after traveling in the restrict mode, as in the first embodiment.

As described above, according to the present embodiment, change of the range of voltage applicable to the battery 108 is permitted based on the instruction from the service center 20, not on the will of the user. Thereby, safer traveling and safer usage of the battery become possible.

Third Embodiment

Figure 5:
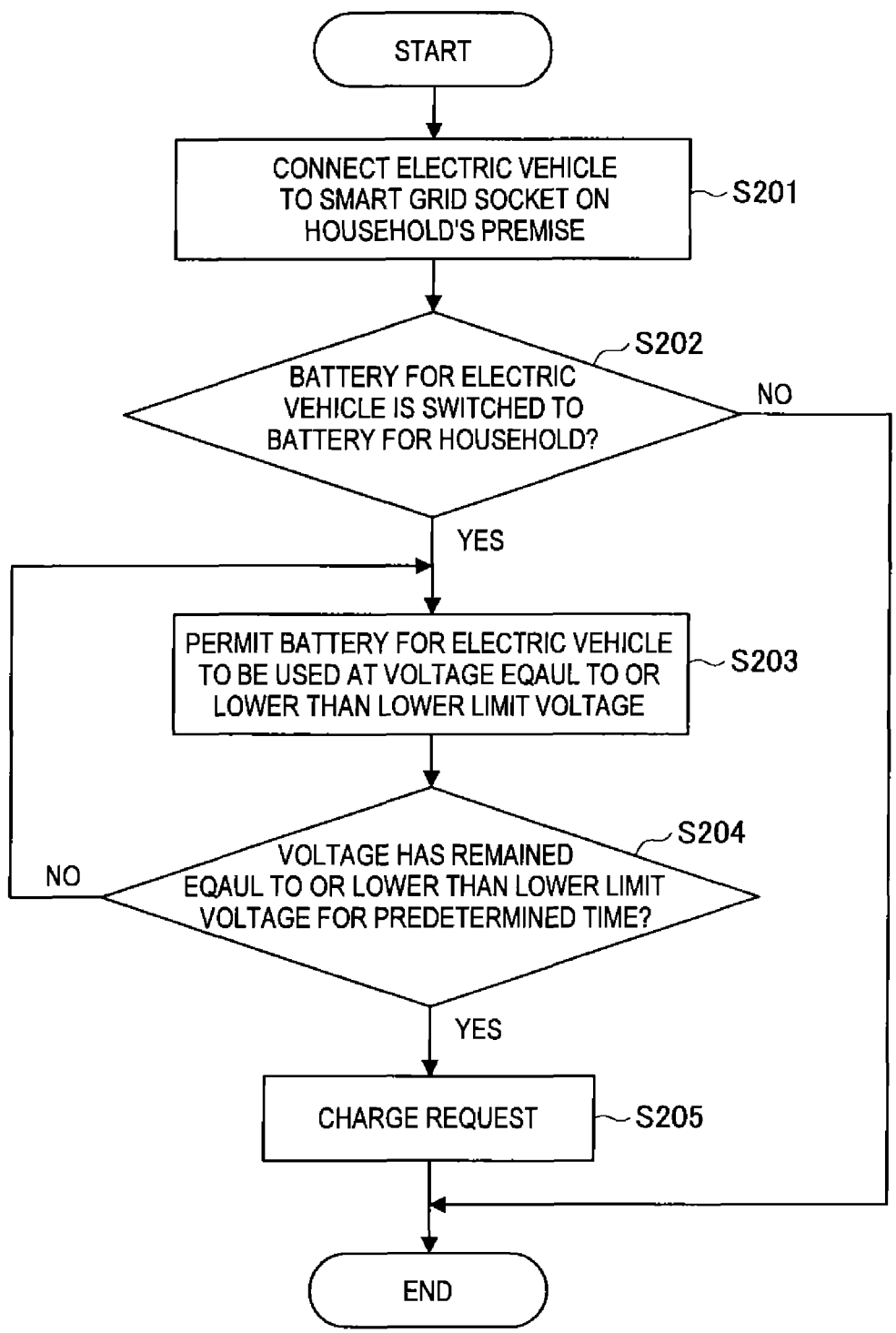
FIG. 5 is a flow chart illustrating power source regulation process according to a third embodiment.

Next, a method of regulating a power source of the battery 108 according the present embodiment will be explained with reference to FIG. 5. FIG. 5 is a flow chart illustrating power source regulation process according to the present embodiment.

A case where the battery 108 of the electric vehicle 100 is used as a battery for a household will be explained. There are given a case where the electric vehicle 100 is connected to a Smart Grid socket on the household's premises and the battery 108 of the electric vehicle 100 is used in place of a battery for a household, and a case where the battery 108 is removed from the electric vehicle 100 and used as a battery for a household.

Figure 7:
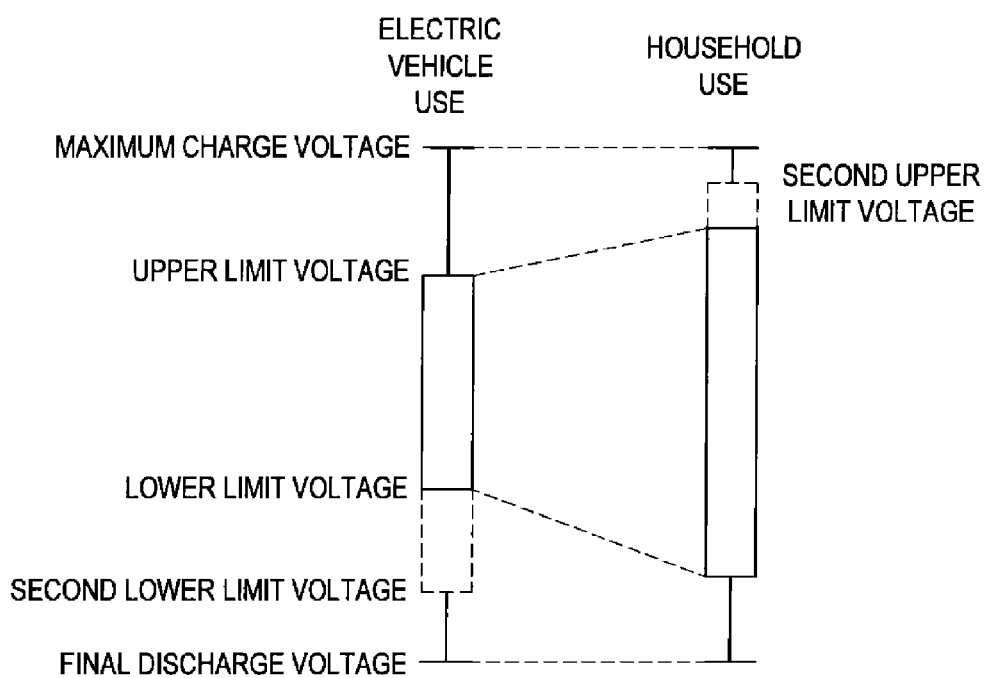
FIG. 7 is an explanatory diagram illustrating ranges of voltage applicable to secondary batteries for an electric vehicle and for a household, respectively, and voltage ranges in which the secondary batteries for an electric vehicle and for a household can be charged/discharged, respectively.

When the electric vehicle 100 is connected to a Smart Grid socket and the battery 108 is used in place of a battery for a household, a power regulation server installed in a household, for example, regulates the battery 108 of the electric vehicle 100, in addition to batteries which the server usually regulates. Incidentally, the upper limit voltage and the lower limit voltage of the battery 108 of the electric vehicle 100 are generally defined more strictly than those of a battery for a household, as shown in FIG. 7. Accordingly, when the battery 108 of the electric vehicle 100 is used as a battery for a household, a limit value of the range of voltage applicable to the battery 108 is temporarily changed, and permission for supplying electric power at the voltage equal to or lower than the lower limit voltage is given to the power regulation server.

Hereafter, a detailed explanation will be made. First, the electric vehicle 100 is connected to a Smart Grid socket on the household's premises (step S201). When a request for switching the battery 108 used for the electric vehicle 100 to a battery for a household is received from the power regulation server (step S202), permission for the battery 108 to supply electric power at the voltage equal to or lower than the lower limit voltage is given, under the condition of household-use (step S203). However, the voltage should not fall below the second lower limit voltage. Further, when the voltage has remained equal to or lower than the lower limit voltage for a predetermined time (step S204), the battery 108 issues a charge request to the power regulation server (step S205).

When the battery 108 is removed from the electric vehicle 100 and used as a battery for a household, the battery 108 is controlled by a user or an electrical worker, for example. Further, the range of voltage applicable to the battery 108 is temporarily expanded by a user or an electrical worker, that is, the range is changed in such a manner that the battery 108 can supply electric power at the voltage equal to or lower than the lower limit voltage. However, the voltage should not fall below the second lower limit voltage.

As descried above, according to the present embodiment, when the battery 108 is used for other purposes, the applicable voltage range is changed. Accordingly, the battery 108 is used appropriately to a use, so that the battery 108 can be efficiently used.

4. Fourth embodiment

Figure 6:
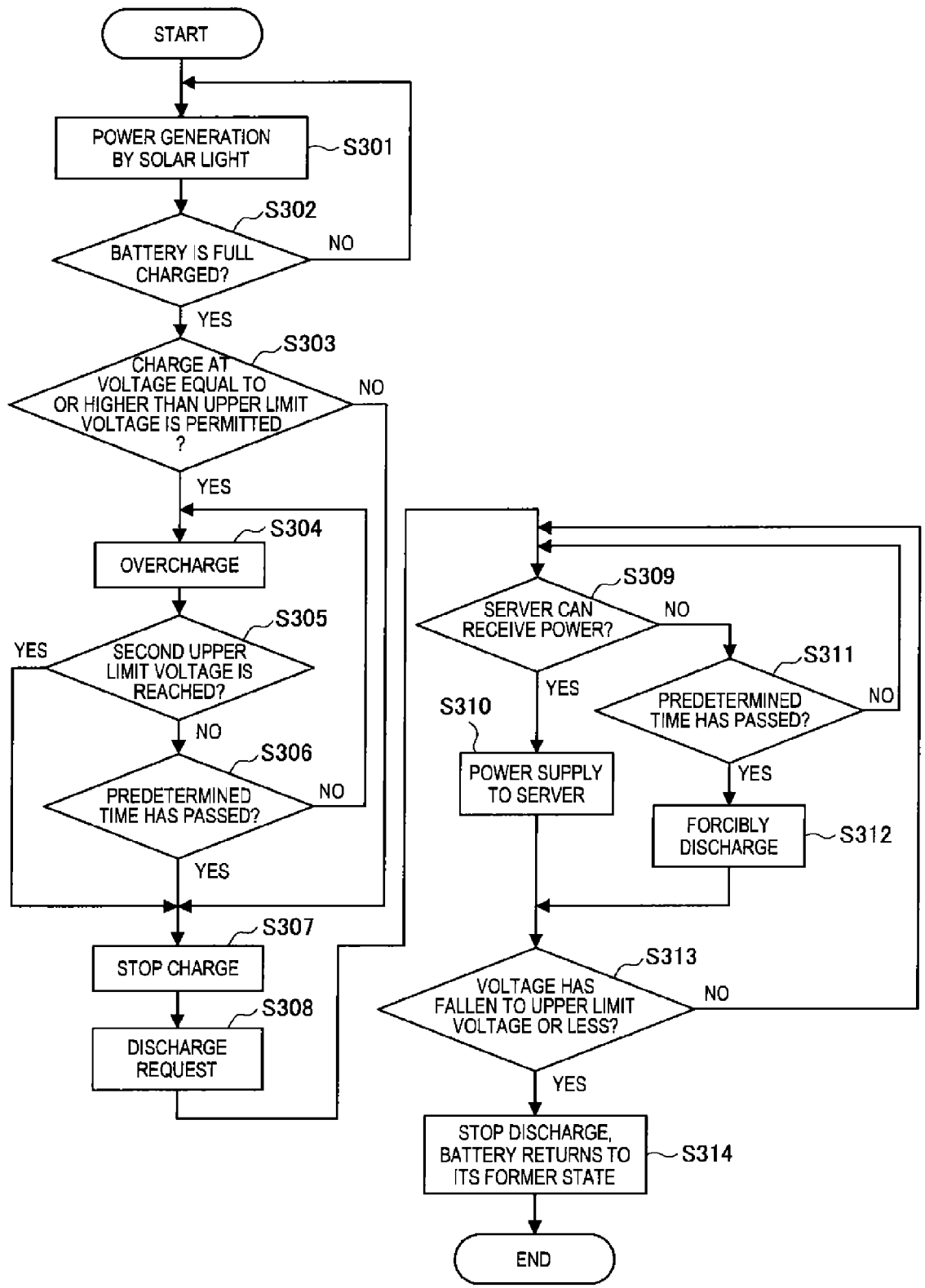
FIG. 6 is a flow chart illustrating power source regulation process according to a fourth embodiment.

Next, a method of regulating a power source of the battery 108 according to the present embodiment will be explained with reference to FIG. 6. FIG. 6 is a flow chart illustrating power source regulation process according to the present embodiment.

In a household, a natural energy generator such as a solar battery is connected to the battery 108 or the like in some cases. When electric power is generated in a natural energy generator, there is the possibility that all batteries installed in a household are fully charged. In this case, the battery 108 of the electric vehicle 100 is also charged. After that, power generation is further performed, and when also the battery 108 is fully charged, a battery 108 which has free capacity is overcharged.

Hereafter, processing to be performed after all batteries installed in a household have been overcharged will be explained in details. First, the battery 108 of the electric vehicle 100 is charged with electric power, which was generated by power generation using natural energy, such as photovoltaic power generation (step S301). When the battery 108 is fully charged by being continuously charged (step S302), it is determined whether or not permission for charge at the voltage equal to or higher than the upper limit voltage is given (step S303). When permission for charge is not given, charge is stopped (step S307).

On the other hand, when permission for charge is given, overcharge is performed in which the battery 108 is charged at the voltage equal to or higher than the upper limit voltage (step S304). After permission was given, when the second upper limit voltage is not reached (step S305), charge is stopped (step S307). The second limit voltage is a value which is higher than the upper limit voltage, and which is equal to or lower than the maximum charge voltage. Further, time during which the voltage is equal to or higher than the upper limit voltage is measured, and when the voltage has exceeded the upper limit voltage for a predetermined time or more (step S306), charge is stopped (step S307). After charge was stopped, the battery 108 issues a discharge request to the power regulation server (step S308).

When the power regulation server can receive electric power from the battery 108 based on the charge request (step S309), the battery 108 supplies electric power to the power regulation server (step S310). On the other hand, when the power regulation server cannot receive electric power (step S309), it is determined whether or not a predetermined time has been reached or exceeded after the upper limit voltage was exceeded (step S311). When a predetermined time has been reached or exceeded after the upper limit voltage was exceeded, the battery 108 is forcibly discharged via an appropriate load (step S312).

When the voltage of the battery 108 has fallen to the upper limit voltage or lower, by being discharged/forcibly discharged via the power regulation server (step S313), the battery 108 stops being charged and returns to its former state (step S314). When the battery 108 was charged at the voltage equal to higher than the upper limit voltage, the charge performance may be recorded within the power regulation server. The charge performance can be used, for example, as a measure of battery replacement. Besides, in the above example, a case has been explained in which the battery 108 of the electric vehicle 100 is regulated by the power regulation server, but the present application is not limited to this example. For example, when the battery 108 is removed from the electric vehicle 100 and used as a battery for a household, the battery 108 is controlled by a user. Further, the range of voltage applicable to the battery 108 is temporarily expanded by the user, that is, the range is changed in such a manner that electric power may be supplied to the battery 108 at the voltage equal to or higher than the upper limit voltage. However, the voltage should not exceed the second upper limit voltage.

As described above, according to the present embodiment, the battery 108 is permitted to be overcharged even when the battery 108 is full charged. Accordingly, when excess electric power was generated by natural energy power generation, the electric power does not have to be wasted because the battery cannot be charged with the electric power, and wasting electric power occurs less often. Further, even when the battery is overcharged, the battery 108 is forcibly discharged under a predetermined condition, and accordingly the function of the battery 108 is not impaired. Therefore, the battery 108 can be flexibly used depending on a situation, while the lifespan of the battery 108 is expanded.

In the related art, control was performed such that the upper limit voltage or the lower limit voltage of the range of voltage applicable to the battery was not exceeded. However, permission for the voltage to exceed the upper limit voltage or the lower limit voltage was not given, though the permission is given in the present embodiment. According to the present embodiment, the range of voltage applicable to the battery is changed, depending on a situation, to the extent that the function of the battery is not impaired, and the battery can be more appropriately used.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A battery controller comprising:
a storing unit which stores a first upper limit voltage and a first lower limit voltage, each defining a first voltage range in which a battery is charged/discharged, and a second upper limit voltage and a second lower limit voltage, each defining a second voltage range which is wider than the first voltage range; and
a charge/discharge regulation unit which changes, when the charge/discharge is performed in the first voltage range and a permission for the charge/discharge in the second voltage range is received from a user, setting of the battery such that the charge/discharge is performed in the second voltage range.

2. The battery controller according to claim 1, wherein, after the setting of the battery was changed, when a value of voltage of the battery has fallen within the first voltage range, the charge/discharge regulation unit restores the setting of the battery such that the battery is charged/discharged in the first voltage range.

3. The battery controller according to claim 1, wherein the storing unit stores time at which the setting of the battery was changed or a number of times the setting of the battery was changed.

4. A battery controller comprising:
a storing unit which stores a first lower limit voltage, which defines a discharge range of a battery of a moving object, and a second lower limit voltage which is lower than the first lower limit voltage;
a voltage measurement unit which measures a current voltage of the battery;
a necessary power calculation unit which calculates electric power of the battery, which is necessary for the moving object to move from a current point of the moving object to a point where the battery can be charged; and
a charge/discharge regulation unit which changes setting of the battery based on the determined current voltage and the calculated electric power, such that the battery is discharged at a battery voltage between the first lower limit voltage and the second lower limit voltage, wherein the setting of the battery is changed when a permission for changing the setting is received from a user.

5. The battery controller according to claim 4, further comprising:
a time measurement unit which measures a time during which the battery is being discharged at the battery voltage equal to or lower than the first lower limit voltage, when the setting of the battery was changed,
wherein the charge/discharge regulation unit gives a warning to the user, when the time during which the battery is being discharged at the battery voltage equal to or lower than the first lower limit voltage reached or exceeded a predetermined time.

6. The battery controller according to claim 4, further comprising:
a time measurement unit which measures a time during which the battery is being discharged at the battery voltage equal to or lower than the first lower limit voltage, when the setting of the battery was changed,
wherein the charge/discharge regulation unit reduces, when the time during which the battery is being discharged at the battery voltage equal to or lower than the first lower limit voltage reached or exceeded a predetermined time, an amount of current to be discharged from the battery after the predetermined time.

7. The battery controller according to claim 6, wherein the amount of current to be discharged from the battery is gradually reduced according to time during which the battery is being discharged at the battery voltage equal to or lower than the first lower limit voltage.

8. The battery controller according to claim 4, further comprising:
a time measurement unit which measures a time during which the battery is being discharged at the battery voltage equal to or lower than the first lower limit voltage, when the setting of the battery was changed,
wherein the charge/discharge regulation unit stops discharge from the battery, when the time during which the battery is being discharged at the battery voltage equal to or lower than the first lower limit voltage reached or exceeded a predetermined time, even if the current voltage is equal to or higher than the second lower limit voltage.

9. The battery controller according to claim 4, wherein the charge/discharge regulation unit reduces an amount of current to be discharged from the battery, when the battery is discharged at the battery voltage equal to or lower than the first lower limit voltage, to be lower than an amount of current to be discharged from the battery when the battery is discharged at the battery voltage higher than the first lower limit voltage.

10. The battery controller according to 4, wherein the battery controller recovers kinetic energy by use of regenerative brake, when the battery is discharged at the battery voltage equal to or lower than the first lower limit voltage.

11. The battery controller according to claim 4, wherein, after the setting of the battery was changed, when the current voltage has increased to the first lower limit voltage or more, the charge/discharge regulation unit restores the setting of the battery such that the battery is discharged exclusively at a battery voltage equal to or higher than the first lower limit voltage.

12. A battery controller comprising:
a storing unit which stores a first upper limit voltage which defines a charge range of a battery, and a second upper limit voltage which is higher than the first upper limit voltage;
a voltage measurement unit which measures a current voltage of the battery; and
a charge/discharge regulation unit which changes setting of the battery, based on the current voltage, such that the battery is charged at a battery voltage between the first upper limit voltage and the second upper limit voltage, wherein the setting of the battery is changed based on a permission for changing the setting received from a user,
wherein the charge/discharge regulation unit stops the charging of the battery and starts discharging of the battery when the current voltage reaches the second upper limit voltage.

13. The battery controller according to claim 12, further comprising:
a time measurement unit which measures a time during which the battery is being charged at the battery voltage equal to or higher than the first upper limit voltage, when the setting of the battery was changed,
wherein the charge/discharge regulation unit stops charging of the battery, when the time during which the battery is being charged at the battery voltage equal to or higher than the first upper limit voltage reached or exceeded a predetermined time, even if the current voltage is equal to or lower than the second upper limit voltage.

14. The battery controller according to claim 12, wherein, in a case where the battery is connected to a Smart Grid, when a time during which the battery is being charged at the battery voltage equal to or higher than the first upper limit voltage reached or exceeded a predetermined time, or when the current voltage reached the second upper limit voltage, the discharge/charge management unit issues a discharge request to a server which regulates power supply of the Smart Grid.

15. The battery controller according to claim 12, wherein, after the setting of the battery was changed, when the current voltage has decreased to the first upper limit voltage or less, the charge/discharge regulation unit restores the setting of the battery such that the battery is charged exclusively at a battery voltage equal to or lower than the first upper limit voltage.

16. A battery control method, comprising:
storing, by a storing unit, a first upper limit voltage and a first lower limit voltage, each defining a first voltage range in which a battery is charged/discharged, and a second upper limit voltage and a second lower limit voltage, each defining a second voltage range which is wider than the first voltage range; and
changing, when the charge/discharge is performed in the first voltage range and a permission for the charge/discharge in the second voltage range is received from a user, setting of the battery such that the charge/discharge is performed in the second voltage range.

17. A battery control method, comprising:
storing, by a storing unit, a first lower limit voltage, which defines a discharge range of a battery of a moving object, and a second lower limit voltage which is lower than the first lower limit voltage;
measuring a current voltage of the battery;
calculating necessary electric power of the battery, which is necessary for the moving object to move from a current point of the moving object to a point where the battery can be charged; and
changing setting of the battery based on the determined current voltage and the calculated electric power, such that the battery is discharged at a battery voltage between the first lower limit voltage and the second lower limit voltage, wherein the setting of the battery is changed when a permission for changing the setting is received from a user.

18. The battery control method according to claim 17, wherein the setting of the battery is changed when the current voltage of the battery reaches the first lower limit voltage.

19. The battery control method according to claim 17, further comprising:
determining an electric capacity of the battery at the battery voltage between the first lower limit voltage and the second lower limit voltage; and
determining whether the moving object is capable of moving from the current point of the moving object to the point where the battery can be charged based on comparison of the calculated electric power and the electric capacity of the battery at the battery voltage between the first lower limit voltage and the second lower limit voltage.

20. The battery control method according to claim 17, wherein the battery is discharged between the first lower limit voltage and the second lower limit voltage at a predetermined discharge current, wherein the predetermined discharge current is lower than an amount of discharge current of the battery before the setting of battery was changed.

21. A battery control method, comprising:
    storing, by a storing unit, a first upper limit voltage, which defines a charge range of a battery, and a second upper limit voltage which is higher than the first upper limit voltage;
    measuring a current voltage of the battery;
    changing setting of the battery, based on the current voltage, such that the battery is charged at a battery voltage between the first upper limit voltage and the second upper limit voltage, wherein the setting of the battery is changed based on a permission for changing the setting received from a user; and
    stopping the charging of the battery and starting discharging of the battery, by the charge/discharge regulation unit, when the current voltage reaches the second upper limit voltage.

22. A non-transitory computer-readable storage medium having stored thereon, a computer program for causing a computer to perform:
    storing a first upper limit voltage and a first lower limit voltage, each defining a first voltage range in which a battery is charged/discharged, and a second upper limit voltage and a second lower limit voltage, each defining a second voltage range which is wider than the first voltage range; and
    changing, when the charge/discharge is performed in the first voltage range and a permission for the charge/discharge in the second voltage range is received from a user, the setting of the battery such that the charge/discharge is performed in the second voltage range.

23. A non-transitory computer-readable storage medium having stored thereon, a computer program for causing a computer to perform:
    storing a first lower limit voltage, which defines a discharge range of a battery of a moving object, and a second lower limit voltage which is lower than the first lower limit voltage;
    measuring a current voltage of the battery;
    calculating electric power of the battery, which is necessary for the moving object to move from a current point of the moving object to a point where the battery can be charged; and
    changing setting of the battery based on the determined current voltage and the calculated electric power, such that the battery is discharged at a battery voltage between the first lower limit voltage and the second lower limit voltage, wherein the setting of the battery is changed when a permission for changing the setting is received from a user.

24. A non-transitory computer-readable storage medium having stored thereon, a computer program for causing a computer to perform:
    storing a first upper limit voltage, which defines a charge range of a battery, and a second upper limit voltage which is higher than the first upper limit voltage;
    measuring a current voltage of the battery;
    changing setting of the battery, based on the current voltage, such that the battery is charged at a battery voltage between the first upper limit voltage and the second upper limit voltage, wherein the setting of the battery is changed based on a permission for changing the setting received from a user; and
    stopping the charging of the battery and starting discharging of the battery when the current voltage reaches the second upper limit voltage.

\* \* \* \* \*